United States Patent [19]

Kondo

[11] 4,132,473

[45] Jan. 2, 1979

[54] FILM TRANSPORT STRUCTURE IN A CAMERA

[75] Inventor: Hidenobu Kondo, Yokohama, Japan

[73] Assignee: Nippon Kogaku K.K., Tokyo, Japan

[21] Appl. No.: 835,600

[22] Filed: Sep. 22, 1977

[30] Foreign Application Priority Data

Oct. 5, 1976 [JP] Japan .......................... 51-134017[U]

[51] Int. Cl.² ............................................. G03B 17/00
[52] U.S. Cl. ................................................ 354/203
[58] Field of Search ............................... 354/202, 203

[56] References Cited

U.S. PATENT DOCUMENTS

| | | | |
|---|---|---|---|
| 1,568,623 | 1/1926 | Riggs | 354/203 |
| 2,324,086 | 7/1943 | Hutchison | 354/203 X |
| 3,002,438 | 10/1961 | Trow | 354/203 |
| 3,508,479 | 4/1970 | Hakamata et al. | 354/203 |

Primary Examiner—Donald A. Griffin
Attorney, Agent, or Firm—Gerald J. Ferguson, Jr.; Joseph J. Baker

[57] ABSTRACT

A camera using a film cartridge is provided with a film transport structure for defining the position of the film laterally of the film travel direction without damaging side edges of the film in guiding a film from a film cartridge onto a film take-up spool, which comprises a pair of guide rails at least one of which has a flat surface adapted to be in contact with side edge of the film and a tapered portion at a trailing end thereof, and a rotatable roller member provided between the film cartridge chamber and the film guide rail having the tapered portion and so constructed that it extends perpendicularly to the film surface and a circumferential surface thereof is tangential with an imaginary flat plane including the flat surface.

5 Claims, 3 Drawing Figures

FILM TRANSPORT STRUCTURE IN A CAMERA

BACKGROUND OF THE INVENTION

This invention relates to a film transport structure in a camera, and more particularly to a structure for defining the position of film laterally of the film travel direction by supporting at least one side edge of the film with a rail having a surface in contact with the edge of the film in guiding it from a film cartridge to a film take-up spool.

Heretofore, in order to prevent the film from shifting laterally of its travelling direction from the film cartridge to the film take-up spool, a pair of parallel guide rails having flat surfaces, respectively, which confront each other and which are to be contacted with both edges of the film, are provided in a camera along and between which the film is guided.

Also, known in the art is a device in which such guide rails are curved continuously and moderately with opposite ends of the rails away from each other in order to prevent the side edges of the film from being scraped by the ends of the rails in winding the film from the cartridge. However, in such conventional structure, the film tends to move with a desired movement of the film cartridge in the camera, as a result of which the film comes off the guide rails and runs over the side surfaces of the rails, causing scratches on the film surface which affect adversely photographic results.

SUMMARY OF THE INVENTION

The present invention is therefore directed to preventing the trouble described above.

More specifically, an object of the invention is to provide a film transport structure in a camera, which positively prevents small particles of the film material due to the scraping of the side edges of the film by the end portions of the rails from being produced during taking-up of the film from a film cartridge to a film take-up spool.

Another object of the invention is to provide a film transport structure which positively prevents the film from coming off the guide rails.

Briefly, the objects are achieved by providing in a camera a film transport structure including a pair of guide rails having flat surfaces adapted to be in contact with side edges of the film respectively and extending in parallel with the film travel direction, respectively, so as to keep the film supplied from the film cartridge at a constant position defined between the rails which structure characterized by a roller member provided between the film cartridge chamber in the camera and the end of one of the film guide rails, said roller member having a circumferential surface tangential with an extension of said flat surface of the one guide rail.

DETAILED DESCRIPTION OF THE INVENTION

Figure 1:
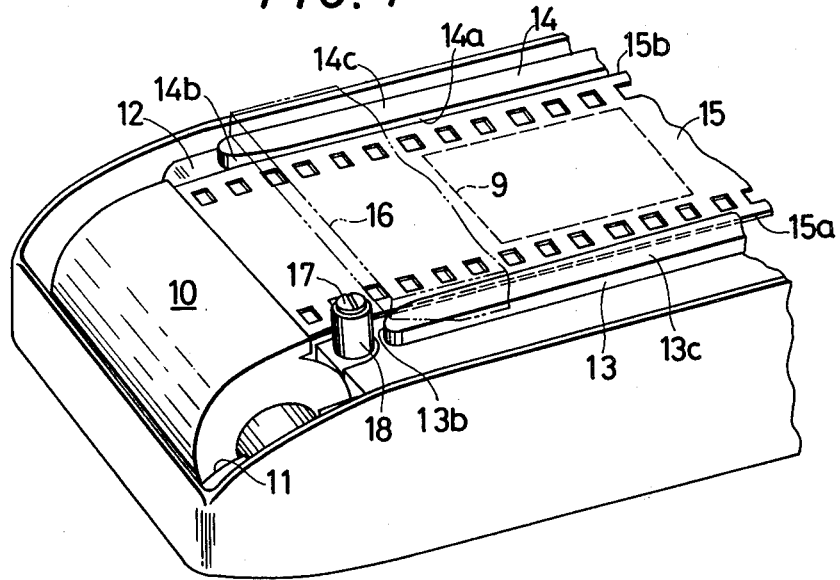
FIG. 1 is a perspective view of an embodiment of a film transport structure according to the present invention.
Figure 2:
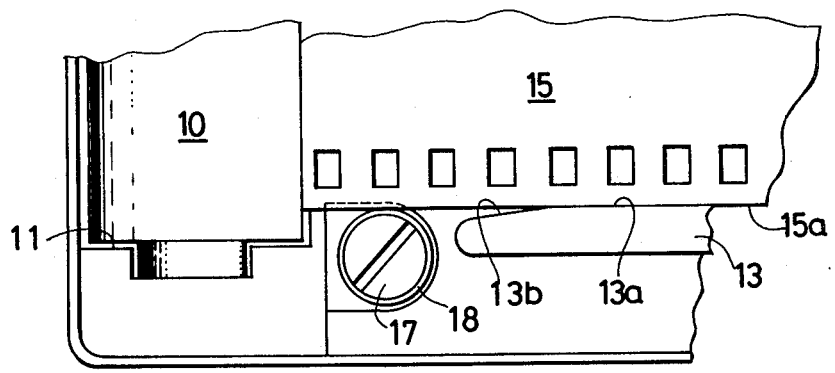
FIG. 2 is a fragmentary plane view of the film transport structure shown in FIG. 1.
Figure 3:
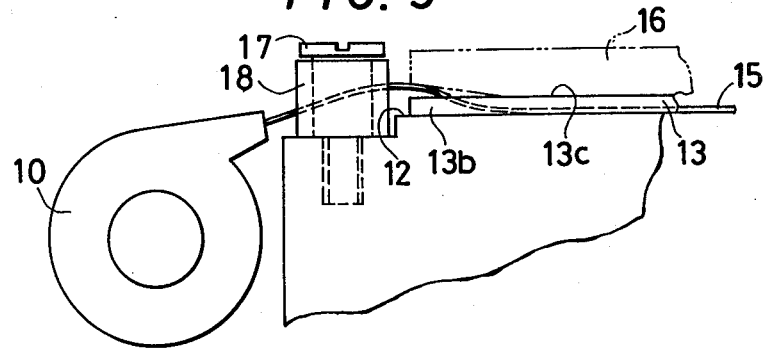
FIG. 3 is a fragmentary side view of the film transport structure shown in FIG. 1.

Referring now to the embodiment of the present invention shown in FIGS. 1, 2 and 3, reference numeral 10 designateds a film cartridge, 11 is a film cartridge chamber formed in a camera, 12 is a back plate of the camera, 13 is a lower guide rail and 14 is an upper guide rail. The rails 13 and 14 define the lateral position of a film 15 with respect to the film travel direction. That is, the guide rails 13 and 14 have flat side surfaces 13a and 14a opposing to each other, respectively and these flat surfaces 13a and 14a are adapted to support a lower and an upper edges 15a and 15b of the film 15, respectively, which is to be drawn from the film cartridge 10 and guided to a film take-up spool (not shown), thereby to define, together with the back plate 12, a film travelling channel passage therebetween. Further, insides of end portions of the guide rails 13 and 14 which are closer to the film cartridge chamber 11 are tapered to form tapered portions 13b and 14b so as to permit the side edges of the film to be guided by the tapered portions smoothly without scraping. A pressure plate 16 shown by phantom lines in FIGS. 1 and 3 is provided inside of a back cover (not shown) of the camera. An inside surface of the pressure plate 16 is brought into a direct contact with top surfaces 13c and 14c when the back cover is closed to thereby present the film 15 from escaping from the channel passage.

Between the tapered portion 13b and the film cartridge chamber 12, there if provided a roller 18 which is rotatably supported by a pin 17 implanted on the back plate 12. The roller 18 is so positioned that the circumferential surface thereof is tangential with an extension of the flat surface 13a of the guide rail 13. Accordingly, the widthwise position of the film is defined by both of the guide rails 13 and 14 and the roller 18. The lower edge 15a of the film 15 drawn from the film cartridge is allowed to smoothly be guided through the roller 18 onto the flat surface 13a of the guide rail 13. Similarly, the upper edge 15b of the film is allowed to ride on the flat surface 14a of the guide rail 14 smoothly due to the presence of the tapered end portions 14b. Therefore, the both side edges 15a and 15b of the film 15 will never by scraped by the end portions of the guide rails at all. Furthermore, the axial length of the roller 18 may be selected to the extent shown in FIG. 3 so that the roller 18 is protruded sufficiently above the plane including the side surface 13c of the guide rail. By selecting the axial length of the roller member as above, it becomes possible to positively present the film from going out from the channel passage even when the film drawn from the cartridge is unexpectedly lifted up from the back plate 12. Accordingly, the film will never come off the guide rails.

In the above-mentioned embodiment of the present invention, a pair of guide rails are provided above and below the aperture, respectively. However, the object of the invention can be achieved without providing the upper guide rail 14.

What is claimed is:

1. In a camera of the type employing a film cartridge in a film cartridge chamber thereof and having a film take-up spool and a pair of upper and lower film guide rails, each having a flat side surface extending in parallel with the film travel direction and adapted to be in contact with one of side edges of a film to regulate the position of said film drawn from said film cartridge, a film transport structure comprising: a roller member supported by a pin fixed between said film cartridge chamber and said film guide rail, to said camera perpendicularly to a surface of said film, said roller member having a circumferential surface tangential with an extension of said flat side surface of one of said film guide rails.

2. A film transport structure as defined in claim 1, wherein said roller member is provided so as to support the lower side edge of said film.

3. A film transport structure as defined in claim 1, wherein said roller member is provided so as to support the upper side edge of said film.

4. A film transport structure as defined in claim 1, wherein an axial length of said roller member is selected so that it extends beyond top surface of said film guide rails.

5. A film transport structure as defined in claim 1, wherein said flat side surface of at least one of said film guide rails has a tapered portion on the side thereof closer to said film cartridge chamber to assure a smooth contact between said flat side surface and an associated side edge of said film drawn from said film cartridge.

* * * * *